Feb. 14, 1939. F. H. RASMUSSEN 2,147,317
DISPLAY APPARATUS
Filed Dec. 6, 1937 2 Sheets-Sheet 1
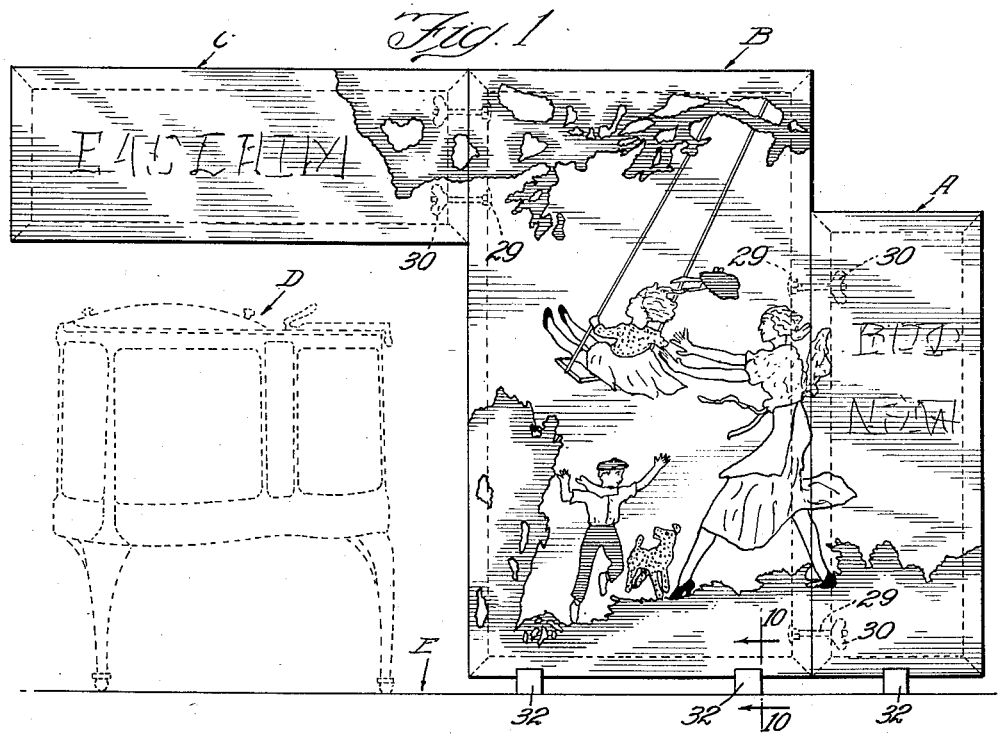
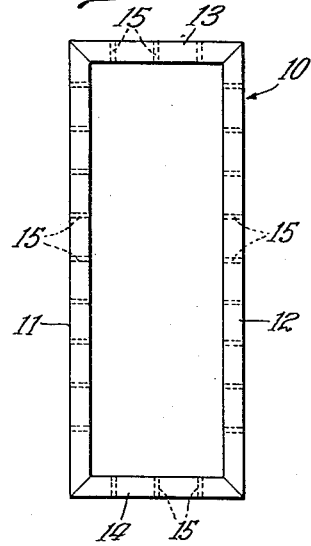
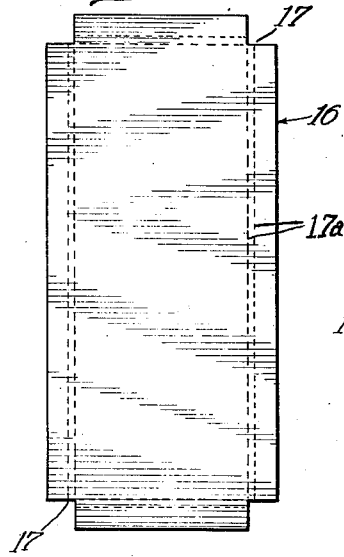
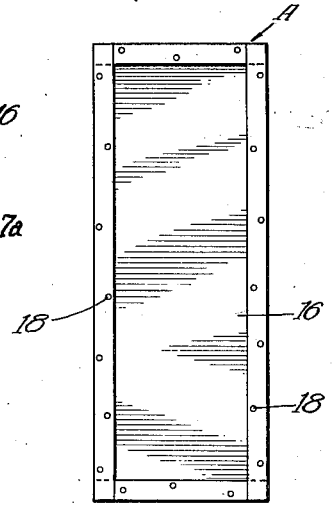
Inventor:
Frank H. Rasmussen

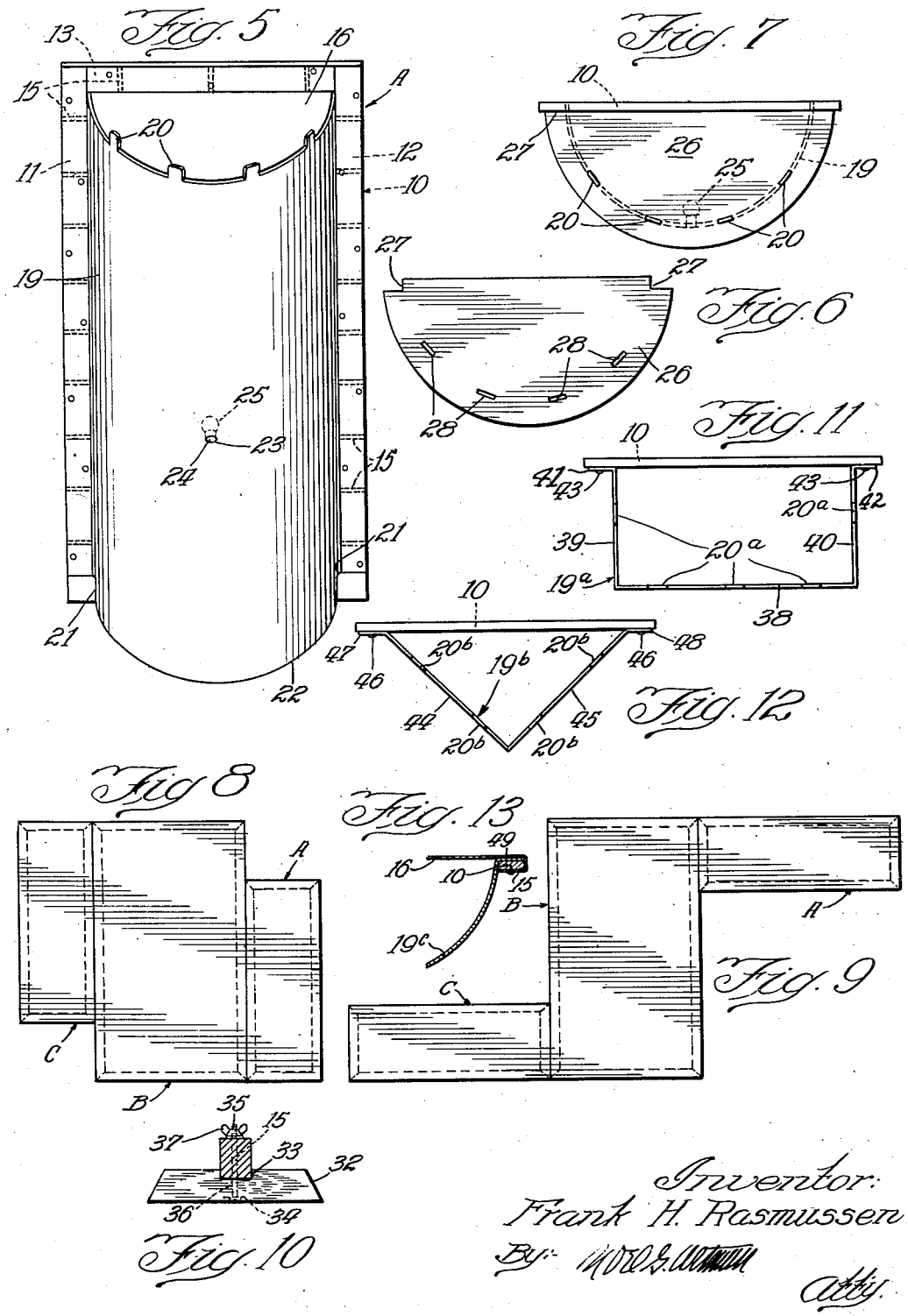

Patented Feb. 14, 1939

2,147,317

UNITED STATES PATENT OFFICE 2,147,317

DISPLAY APPARATUS

Frank H. Rasmussen, Chicago, Ill., assignor to Magill-Weinsheimer Company, Chicago, Ill., a corporation of Illinois Application December 6, 1937, Serial No. 178,250

10 Claims. (Cl. 40—124.1)

This invention has to do with apparatus for use in the display of merchandise and relates more particularly to an adjustable advertisement bearing structure adapted to effect an attractive setting for merchandise.

The objects of the present invention include the provision of:

An improved display structure comprising a plurality of panels which are relatively adjustable to provide fields of proper shape for receiving advertising layouts of varied designs.

A novel frame structural unit interfabricatable with other similar units and adapted to removably receive a sheet bearing advertising material.

A new display apparatus including a plurality of planar units relatively adjustable to effect a planar advertising field, and the units being of predetermined size and shape to individually receive sheets bearing component parts of advertising matter.

With the above and other desirable objects in view, the invention is hereinafter described with reference to the accompanying two sheets of drawings hereby made a part of this specification and wherein:

Fig. 1 is a front view of an embodiment of the invention as it may appear while in use;

Fig. 2 is a back view of a frame member constructed in accordance with the principles of the present invention;

Fig. 3 is a plan view of an advertising or display sheet which may be secured upon the frame shown in Fig. 2;

Fig. 4 shows from the back side the frame member of Fig. 2 having mounted thereon the sheet shown in Fig. 3;

Fig. 5 illustrates a light reflector member as it may be attached upon the back side of the assembly of Fig. 4;

Fig. 6 shows a cover member piece for one of the units of the apparatus;

Fig. 7 is an end view of the parts shown in Fig. 5 and with the cover member of Fig. 6 assembled therewith;

Figs. 8 and 9 are front views corresponding to Fig. 1, but showing the units or panels arranged differently;

Fig. 10 is a fragmentary sectional view taken on the line 10—10 of Fig. 1;

Fig. 11 is a top end view of a panel having a different form of light reflector member;

Fig. 12 is a view like Fig. 11, but illustrating a still different form of light reflector member; and Fig. 13 is a fragmentary transverse sectional view showing a light reflector which has flanges disposed upon the front of a panel frame member.

Similar parts where shown and designated in more than a single figure of the drawings and where referred to hereinafter will be indicated by the same reference character.

Attention is first invited to Fig. 1 where apparatus consisting of similarly constructed units or panels A, B and C is illustrated as it may be disposed for providing a display setting about an article of merchandise generally designated D, shown in dotted outline. The supporting surface E for the item D and for the display apparatus A, B and C may be a section of the floor in a sales room, or it may be the floor section behind a display window or the like.

Unit A will now be described with reference to Figs. 1 to 7, inclusive. A frame 10 for the unit A is shown in Fig. 2. The frame 10 has side pieces 11 and 12, a top piece 13 and a bottom piece 14. Said pieces may be made of wood or other sufficiently rigid material preferably light in weight. In the illustrated embodiment the frames 10 of the units have a rectangular profile and the ends of the frame pieces are mitered so such pieces may be readily joined at right angles. Each of the frame pieces 11, 12, 13 and 14 is provided with a plurality of holes 15, the purpose of which will be hereinafter made apparent.

A sheet 16 of material suitable for bearing advertising or decorative subject matter is shown in Fig. 3, the reverse side of such sheet being exposed. Ordinarily the sheet 16 will be formed of paper and the informative matter carried thereby will be imprinted upon its obverse side in some such manner as by a lithographic process. The sheet 16 has notches 17 cut in each of its corners and scored fold lines as 17a extending between such notches. Assembly of the sheet 16 upon the frame 10 is accomplished by transferring the frame over onto the back of the sheet while the latter is lying face downwardly upon a flat surface. Said frame is thus registered with the sheet 16 in such a manner as to coincide with the rectangular dotted outline shown in Fig. 3. Thereafter the edge sections of the sheet 16 are turned upwardly and over, as illustrated in Fig. 4, the edge sections being held in the folded-over position by means of thumb tacks 18 or other means adapted to removably hold the sheet upon the frame. A rectangular light reflector sheet 19, Fig. 5, having lugs 20 projecting from its upper edge and having notches 21 formed at each of its lower corners, is attached to the back of the frame 10 by being bowed while its vertical edges are inserted into the plane like space embraced by the frame. The light reflector sheet may be resilient so the vertical edge sections thereof will be urged outwardly into frictional engagement with the inner opposed faces of the frame pieces 11 and 12, to thus hold the parts together. The notches 21 extend vertically coextensively with the lower frame piece 14 so that the lower edge 22 of the light reflector member 19 will rest upon the floor and serve as a brace for folding the unit upright. An aperture 23 may be provided for receiving a socket 24 for an electric light bulb 25 disposed interiorly of the unit.

Also forming a part of the unitary assembly is a semi-circular cover member 26 which has notches 27 cut at the juncture of its curved and chordal edges. Said cover member 26 contains a row of apertures 28 for receiving the lugs 20 of reflector member 19 when the cover member is assembled with the unit as illustrated in Fig. 7. Notches 27 are adapted to receive transverse sections of the frame pieces 11 and 12 as an incident to the chordal edge of the cover member being inserted into the frame immediately beneath the lower face of upper frame piece 13.

That part of the unit which has just been described in association with the rear of the frame member 10 makes the apparatus capable of providing effective displays at night. When the lamp 25 is energized the interior of the unit will become illuminated, and when the sheet 16 is translucent the advertising or decorative matter thereon becomes plainly visible to an observer occupying a position in front of the device. Escapement of unwanted light is prevented by the cover member 26 and by the surface upon which the unit rests.

Once more attention is addressed to Fig. 1 where unit A, the detailed structure of which has been described, is shown set with units B and C. Unit B is identical with unit A with the exception of being greater in size. Unit C is identical with unit A with the exception that the reflector member 19 therefor will have cover members 26 at each of its ends and will be accordingly equipped with lugs 20 upon both ends instead of at only one end as is the reflector 19 shown in Figs. 5 and 6. Units A and B are secured together by means of bolts 29 inserted into aligned holes 15 therein and held in place by wing nuts 30. In a like manner unit C is attached to unit B. The units may be assembled with their adjacent edges in many different positions of longitudinal adjustment and with any edge of any unit disposed adjacently to any edge of any other unit, and, consequently, the composite display surface of the combined units may be arranged in profile for best showing the subject borne thereby. For example, unit C may be removed from unit B, by withdrawing the bolts 29, and reattached thereto at a lower elevation by aligning different holes 15 for receiving the bolts. Holes 15 of one of the longer sides of the unit or panel C may be aligned with holes in one of the frame pieces of unit B, if desired, and the bolts reinserted therein to maintain the setup. Likewise unit or panel A may be detached and reattached to units B or C. Two possible different arrangements are shown in Figs. 8 and 9.

Sometimes it may be desired not to employ the light reflector parts at the rear of the panels A, B or C, in which event substitute means such as that shown in Figs. 1 and 10 may be used for holding the apparatus upright. This means consists of feet 32 constructed of wood or other suitable material which may be employed as illustrated in Figs. 1 and 10. Each foot 32 has a transverse groove 33 adapted to receive a section of the lower piece 14 of the panel it is to support. The bottoms of the feet may be recessed at 34 to receive the head of a bolt 35 which may be projected through a hole 36 of the foot and aligned with one of the holes 15 in the frame piece 14. A wing nut 37 may be tightened upon the bolt 35 to hold the parts in assembly. When the panel is relatively wide as is the panel or unit B of Fig. 1, two or more feet may be used for its support. The narrower panel A, Fig. 1, is shown supported by a single foot 32.

Apparatus built in accordance with the present invention is especially useful to manufacturers or others who advertise extensively by means of similar displays. Such establishments may provide for a set of frames at each place a series of varied advertising layouts are to appear. The pictorial design or other advertising matter is arranged in such a way that it can be presented upon the frames when they are secured together in one of their possible combinations. Sometimes a design will be carried complementally by the units as shown in Fig. 1, and when such is the case the component parts thereof will appear upon different sheets 16 which are properly matched incident to the units being fastened together in a predetermined manner. Periodically the individuals at the respective points of display will receive fresh sheets 16, bearing different advertising matter, and which are attached to the units in place of the previously used sheets 16. Should the new sheets 16 require a different interfabricated relation of the units A, B and C that fact may be communicated to the individual. This procedure incurs limited expense as compared to display methods employing entirely new units of cardboard or the like each time a display is changed. A relatively light weight paper sheet 16 may be used for placing upon the front of the frames. Such sheets are more easily handled during the printing or lithographing process than are the relatively unwieldy cardboard easels they are adapted to replace. Moreover, the cost of the material and the shipping costs are less. Flexibility of display layout approaching that obtainable with completely new easel equipment with each change of display is obtainable because of the different combinations in which the units may be arranged.

It will be noted also that the subject matter portrayed by each of the units A, B and C may be complete in itself, and therefore one or more of the units may be used while detached from the others, either in the same or in a different display setup.

The light reflector member 19 may be shaped differently than it is shown in Figs. 5 and 7. For example the light reflector member 19a in Fig. 11 has a broad flat back section 38 from which extend side sections 39 and 40 at right angles to said back section. Flanges 41 and 42 of the member 19a may be secured to the frame 10 in any suitable manner as by means of vertical rows of thumb tacks 43 of which only the uppermost in each of the two rows are visible in Fig. 11. Lugs 20a are provided at intervals along the upper edge of the member 19a and for cooperating with apertures within a cover member (not shown) in a manner similar to that in which the lugs 20, Figs.

5 and 7, cooperate with the apertures 28 in cover member 26.

A light reflector member 19b, of V-section is shown in Fig. 12. The member 19b has side sections 44 and 45 which are secured to the back of frame member 10 by means of rows of thumb tacks 46, or the like, inserted through the longitudinal flanges 47 and 48 and into the frame 10. Lugs 20b corresponding to lugs 20 and 20a, hereinabove described, are provided along the upper edge of the member 19b so as to facilitate attachment thereto of an apertured cover member (not shown) to function similarly to the cover member 26.

The light reflector member 19c, half of which is shown in Fig. 13, has longitudinal flanges 49 inserted between the front of side pieces 15 of frame member 10 and the sheet 16 thereon This form of the apparatus has the advantage of very effectively eliminating crevices through which light can escape.

I claim:

1. In merchandise display apparatus, a plurality of frames adapted to respectively receive complementary parts of an advertising layout, each of said frames having within its edges selectively spaced apertures registerable with like apertures in an adjacent of said frames, and holding means insertable into such registered apertures, said holding means being thus adapted to hold said frames in co-assembly, said frames being inter-adjustable incident to registry of different of such apertures for receiving said holding means, and such inter-adjustability of the frames rendering them readily receivable of varied advertising layouts and also enabling selected of said frames to depend selectively from at least one of the other thereof as the sole means of support.

2. Display apparatus comprising a frame member having front and back sides and including opposite edge pieces having opposed faces, a resilient light reflector sheet upon the back of said frame, said sheet having a pair of opposite edges and an intermediate edge extending between such opposite edges, lugs projecting outwardly from said intermediate edge, and a substantially semi-circular sheet provided with a line of apertures spaced inwardly from the curved edge thereof, said resilient sheet being bowed incident to carrying the opposite edges thereof nearer together and being assembled with said frame member by permitting such edges to impinge outwardly against the opposed faces of the frame member, and said semi-circular sheet being disposed with its chordal edge in contiguity with the plane of said frame member and with the apertures thereof embracing the lugs of said resilient sheet.

3. Display apparatus comprising a frame member having front and back sides and including opposite edge pieces having opposed faces, a substantially semi-cylindrical light reflector member upon the back side of said frame member and having opposite longitudinal edges disposed inwardly of said frame member contiguously of the opposed faces thereof and an intermediate edge between said longitudinal edges, fastening means on said intermediate edge, and a substantially semi-circular cover member at an end of said frame member, the chordal edge of said cover member being arranged adjacently to said frame member and the curved edge thereof being projected backwardly of said frame member into engagement with the light reflector member, and said fastening means serving to retain said cover member in such engagement.

4. Display apparatus comprising a frame member having top and bottom pieces and side pieces, and a light reflector sheet having side edges and a bottom edge, there being notches cut in said sheet at the juncture of the side and bottom edges, said sheet being bowed to permit insertion of the side edges thereof interiorly of said frame member against said side pieces, and said notches receiving the lower frame piece to enable the lower edge of the sheet to project downwardly substantially to a common level with the lower side of said bottom frame piece.

5. Apparatus as set out in claim 4 wherein a substantially semi-circular cover member is provided, said cover member having notches at the juncture of its curved and chordal edges and being disposed normally of said frame member with its chordal edge inwardly of and adjacently to said upper frame piece while such notches receive portions of the frame side pieces, and the curved edge of said cover member projecting over and into substantial registry with the upper end of the bowed sheet.

6. For use in the advertising of merchandise or the like, advertising apparatus adapted to be associated with said merchandise and comprising a plurality of substantially rigid planar frame members each having about its edge a plurality of sections including relatively angularly disposed sections adapted to be alternatively interfabricated with similar sections of another of said frame members, a replaceable advertising bearing sheet removably disposed upon each of said frame members, said sheets being cut similarly in shape to a face of their respective frame members but being oversize with respect thereto thereby providing overlapping marginal sections, said marginal sections being wrapped over and about the edges of their respective frame members to completely conceal the same, said marginal sections being notched to facilitate such wrapping, means for interfabricating any of said edge sections of any of the frame members with any of said edge sections of another of the frame members at selectable positions lengthwise of the sections so interfabricated whereby said frame members are adjustable to receive an advertising layout of which the field is selectively shaped for association with said merchandise.

7. For use in the advertising of merchandise or the like, advertising apparatus adapted to be associated with said merchandise and comprising a plurality of substantially planar frame members having a front side and a back side and each having about its edge a plurality of sections including relatively angularly disposed sections adapted to be engaged for interfabrication with edge sections of other of said frame members, a sheet of advertising bearing material placed over the front side of each of said frame members, a light reflector sheet upon the back side of each frame member, each of said light reflector sheets having opposite edges disposed upon the opposite edges of its respective frame member and having a light reflecting portion between said sheet edges projected rearwardly of said frame member, means for interfabricating any of said edge sections of any of the frame members with any of said edge sections of another of the frame members at selectable positions lengthwise of the sections so interfabricated whereby said frame members are adjustable to receive an advertising layout of which the field is selectively shaped for association with said merchandise.

8. In an advertising apparatus a panel structure comprising a frame member having a front face, an advertising-bearing sheet upon such front face, and a light reflector member having along at least one edge thereof a flange turned angularly to that part of the light reflector member adjacent thereto, said light reflector member being disposed to the rear of said frame member and having said flange disposed between the front face of said frame member and said advertising-bearing sheet as an expedient to retaining said light reflector member in assembly with said panel structure and to preventing light emission at the area of engagement of said flange and said frame member.

9. For use in the advertising of merchandise or the like, advertising apparatus adapted to be associated with said merchandise and comprising a plurality of complementary frames each capable of bearing advertising matter and each having a plurality of edge sections, and fastening means adapted to interfabricate said frames along said edge sections, said fastening means providing for fabrication of selectable edge sections of any of the frames with selectable edge sections of another of the frames at variable positions lengthwise of said edges and whereby a part of said frames are solely supported by others in selected association with the merchandise.

10. For use in the advertising of merchandise or the like, advertising apparatus adapted to be associated with said merchandise and comprising a plurality of complementary panels each capable of bearing advertising matter and each having about its edge a plurality of sections including nonparallel sections, fastening means at said sections for facilitating interfabrication of said panels along said sections, said fastening means providing for fabrication of any of said edge sections of any of the panels with any of said edge sections of another of the panels and also permitting such interfabrication of said edge sections at different relative positions lengthwise thereof whereby said panels are adjustable to receive an advertising layout of which the field is selectively shaped for association with said merchandise.

FRANK H. RASMUSSEN.